(12) United States Patent
Eitler

(10) Patent No.: US 12,455,321 B2
(45) Date of Patent: Oct. 28, 2025

(54) METHOD FOR DETERMINING A CAPACITY OF AN HV BATTERY

(71) Applicant: Dr. Ing. h.c. F. Porsche Aktiengesellschaft, Stuttgart (DE)

(72) Inventor: Moritz Eitler, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 164 days.

(21) Appl. No.: 18/244,620

(22) Filed: Sep. 11, 2023

(65) Prior Publication Data
US 2024/0133964 A1 Apr. 25, 2024
US 2024/0230774 A9 Jul. 11, 2024

(30) Foreign Application Priority Data
Oct. 19, 2022 (DE) .................. 10 2022 127 414.4

(51) Int. Cl.
| | |
|---|---|
| *G01R 31/388* | (2019.01) |
| *B60L 58/12* | (2019.01) |
| *B60L 58/16* | (2019.01) |
| *G01R 31/392* | (2019.01) |
| *G01R 31/367* | (2019.01) |

(52) U.S. Cl.
CPC ............ *G01R 31/388* (2019.01); *B60L 58/12* (2019.02); *B60L 58/16* (2019.02); *G01R 31/392* (2019.01); *G01R 31/367* (2019.01)

(58) Field of Classification Search
None
See application file for complete search history.

(56) References Cited

U.S. PATENT DOCUMENTS

| | | | |
|---|---|---|---|
| 10,322,634 B2 | 6/2019 | Wang et al. | |
| 2003/0214303 A1* | 11/2003 | Ying | ..................... G01R 31/392 |
| | | | 324/426 |
| 2006/0244458 A1 | 11/2006 | Cho et al. | |

(Continued)

FOREIGN PATENT DOCUMENTS

| | | |
|---|---|---|
| DE | 102020103179 A1 | 8/2021 |
| DE | 102020127773 A1 | 4/2022 |
| DE | 102020130732 A1 | 5/2022 |

OTHER PUBLICATIONS

British Search Report dated Mar. 4, 2024.

*Primary Examiner* — Jas A Sanghera
(74) *Attorney, Agent, or Firm* — Gerald E. Hespos; Michael J Porco

(57) ABSTRACT

A method is provided for determining a capacity of a traction battery. The method includes initiating and/or waiting a predetermined time during which a battery current is below a threshold amount. The method proceeds by selecting an OCV characteristic curve from a group of such curves (31-33, 41-43) based on at least two parameters (P1, P2, . . . Pn). At least one parameter (P1) describes a cell characteristic of battery cells used in the traction battery, and at least a second parameter (P2) describes an operating parameter of the traction battery prior to the predetermined time and/or during the predetermined time. The method continues by determining an open circuit voltage of the traction battery after the predetermined time has elapsed and determining the capacity of the battery based on the selected OCV characteristic curve.

8 Claims, 1 Drawing Sheet

(56) References Cited

U.S. PATENT DOCUMENTS

| | | | |
|---|---|---|---|
| 2013/0300425 A1* | 11/2013 | Shiraishi | G01R 31/382 |
| | | | 324/426 |
| 2016/0103185 A1 | 4/2016 | Chang et al. | |
| 2018/0321323 A1 | 11/2018 | Dubarry et al. | |
| 2021/0141028 A1 | 5/2021 | Du et al. | |
| 2023/0065968 A1* | 3/2023 | Nishikawa | G01R 31/374 |

* cited by examiner

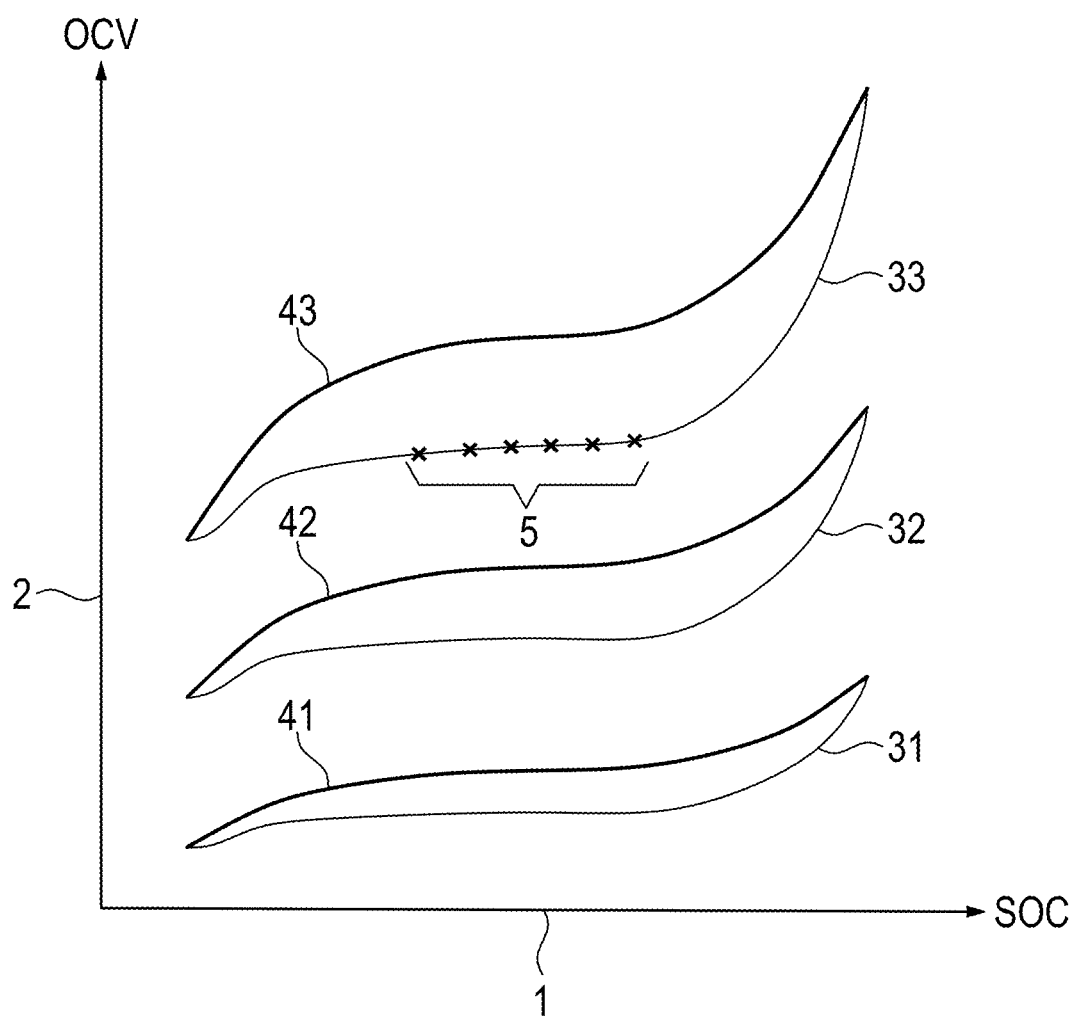

METHOD FOR DETERMINING A CAPACITY OF AN HV BATTERY

CROSS REFERENCE TO RELATED APPLICATION

This application claims priority on German Patent Application No 10 2022 127 414.4 filed Oct. 19, 2022, the entire disclosure of which is incorporated herein by reference.

BACKGROUND

Field of the Invention. The invention relates to a method for determining a capacity of an hv battery, for example a traction battery of a semi- or fully electrically driven vehicle.

Related Art. A so-called open circuit voltage (OCV) adjustment typically is carried out to determine the exact state of charge (SOC) of an HV battery. To this end, OCV is measured on the individual cells of the HV battery after a certain load-free idling phase. A measured OCV is associated with a particular SOC value, and the relationship between the OCV and SOC is determined by a so-called OCV characteristic curve.

To determine the battery capacity, an OCV adjustment in terms of the battery capacity is made before and after a larger SOC hub, while the associated power integral is determined for the duration of the occurring SOC hub, i.e. during a charging or discharging process of the HV battery. The current battery capacity can be calculated from the determined current integral and the precisely determined open circuit voltages. The value of the battery capacity is of great importance for an electric vehicle because, for example, this value represents a parameter that is relevant for the range of the electric vehicle. However, the value of the battery capacity decreases over the life of the HV battery. Therefore, updating the value of the battery capacity is important.

The known method for determining a battery capacity outlined above has a problem in that OCV characteristic curves of certain cell chemistries exhibit a hysteresis. This means that, depending on the history of a previously occurring battery load through charging and discharging operations, a different neutral voltage is set. It is known that the open circuit voltage is higher after a charging load than after a discharging load.

A journey with an electric vehicle usually is characterized by alternating and varying intensity of charging loads (recuperation phases) and discharging loads (accelerations, constant travel). The nominally specified charging OCV characteristic curve (OCV characteristic curve characterizing a pure charging process) only applies after a certain time (e.g. a few minutes) during which a certain charging load (e.g. a few amperes) is applied. Analogously, the discharging OCV characteristic curve (OCV characteristic curve characterizing a pure discharging process) applies only after a certain time (e.g. a few minutes) during which a certain discharging load (e.g. a few amperes of discharging current) is applied. Switching between charging and discharging while driving usually occurs with no idle phase. Thus, the use of either of the two OCV characteristic curves in the OCV adjustment results in falsified neutral voltage values due to a hysteresis of the OCV characteristic curve. The SOC values determined based on these values also are inaccurate, in extreme cases into the double-digit percentage range. Accordingly, the capacity determination also provides an inaccurate result (a few % points). In traction batteries used in electric vehicles, this can mean a falsification of the range information into the double-digit kilometer range, which can be very frustrating for a driver of an electric vehicle that might break down just before getting home.

To solve this problem, U.S. Pat. No. 10,322,634 B2 proposes charging a traction battery only when it is relaxed, which can be determined by means of a saved battery profile or elapsing of a corresponding relaxation time. Charging can begin immediately if the traction battery is found to be relaxed. Charging the battery is postponed for the relaxation period if the battery is not relaxed. Finally, the battery capacity is determined based on the state of charge at the start of charging, the charging current, and the state of charge at the end of charging.

DE 10 2020 127 773 A1 discloses a method for determining a capacity of a battery cell assembly of a motor vehicle. A processor circuit uses current strength data of a measuring circuit during operation of the battery cell assembly to detect whether a battery current of the battery cell assembly different from zero is a constant current. Additionally, or alternatively, such a constant current is set purposefully in that the constant current is set as the battery current by the processor circuit by means of a control signal to a control circuit. Thus, a constant current is waited for or specifically set. Further, with the detected and/or set constant current, a predetermined waiting period is waited until the concentration gradients caused by the material transport within the cell and the resulting over voltages are approximately constant. After waiting for the waiting period, there is therefore an approximately constant overvoltage. Then (with flowing constant current), a value of the temporal gradient of the battery voltage is determined from the voltage value data of the measurement circuit, which is assigned to a capacity value by a predetermined allocation device.

US 2006/0244458 A1 discloses a method for determining a battery capacity in which a first OCV value is measured to determine the SOC values. A test then is performed with dynamic voltage patterns (e.g. a discharging during the journey), and a relaxation time then is waited before a second OCV value is measured. The OCV values determined by discharging capacity measurement are converted into corresponding SOC values based on a table previously experimentally determined so as to ultimately determine the current battery capacity.

In light of the foregoing, an object of the invention is to provide a method for determining a capacity of a HV battery as accurately as possible.

SUMMARY OF THE INVENTION

The invention is based on the finding that the history of the traction battery must be taken into account for a more precise determination of the capacity of the traction battery based on the OCV characteristic curve. In addition, batteries based on modern cell chemistries all have a pronounced voltage hysteresis of the OCV voltage. Thus, even after waiting for a sufficiently long relaxation time, the OCV voltage of the battery at a state of charge achieved by a charging process is higher than the OCV voltage at the same state of charge achieved by a discharging process. In addition, the OCV characteristic curve is determined by numerous other parameters. A first group can have parameters that depend on the cell chemistry of the battery cells. An exemplary parameter from the first group can be indicative of the battery health (state of health, SoH). This value quantifies (in percent) the decrease in battery capacity as a result of aging versus its nominal capacity. A second group of parameters can be operational or environmental parameters of the battery. Exemplary parameters from the second group can be a power integral, maximum power values within a predetermined time period, and/or the average temperature of the battery cells.

Monitoring the operating parameters during travel and thus during operation of the battery enables the overall condition of the battery to be tracked. Thus, an optimally matching OCV characteristic curve can be used at the time of determining the OCV voltage, which depends on the loading history and is described by parameters of the first and/or the second group.

An optimal OCV characteristic curve considers the current state of the cell chemistry and the past operating parameters and can be selected from a plurality of OCV characteristic curves that have been experimentally determined or simulated in advance. Stated another way, the group of operating parameters and cell chemistry parameters determined in the monitored operating portion of the battery can be associated with a present OCV characteristic curve with the greatest similarity as part of an optimization problem of a group of operating parameters and cell chemistry parameters for selecting a best matched OCV characteristic curve. More particularly, the OCV characteristic curve determined earlier can be used experimentally or by a simulation in which the associated parameters (cell chemistry parameters and operating parameters) are as close as possible to the operating parameters determined in the monitored operating portion of the battery.

The individual operating parameters and cell chemistry parameters can be provided with a weighting factor that expresses the influence that a present deviation has on the progression of the OCV characteristic curve. For example, a variation in the temperature of the battery can have a weaker effect on the progression of the OCV characteristic curve than the presence of battery currents close to the maximum current. Thus, when selecting the appropriate OCV characteristic curve, a smaller deviation in this operating parameter with the greater impact can be sought.

The simulation of the OCV characteristic curves can be based on a model of the battery that simulates the electrochemical processes taking place in a battery cell based on cell chemistry parameters and operating parameters and calculates the associated OCV characteristic curve therefrom.

One aspect of the invention provides a method for determining a capacity of a traction battery. The OCV characteristic curve of the battery indicative of the relationship between the state of charge and the OCV voltage can have a hysteresis. In a first step, the method can include initiating and/or waiting for a predetermined time period during which a battery current is below a threshold amount. In particular, during the predetermined time period, a very minor or even negligible battery current can flow so that, in that time, the cell chemistry can find its equilibrium state. As a result, an OCV voltage value that is as pure as possible can be determined.

The method further may comprise selecting an OCV characteristic curve from a group of OCV characteristic curves based on at least two parameters. At least one parameter describes a cell characteristic of battery cells used in the traction battery and at least one further parameter describes an operating parameter of the traction battery prior to the predetermined time period and/or during the predetermined time period. The at least one operating parameter is a value that depends on the operating history of the battery. Depending on the amount of the threshold battery power selected during the predetermined time period, the predetermined time period can be omitted or taken into account in this consideration. For example, if, during the predetermined time period, the electric vehicle is in a parking lot and only the multimedia system is operated, the battery power flowing from the traction battery and its influence on the battery cell chemistry can be neglected.

The operating parameters or the characteristic values correlated therewith can be used as part of the method of the invention. For example, in one embodiment of the method, the group of OCV characteristic curves can include five different subgroups of OCV characteristic curves. The operating temperature at which the OCV characteristic curves have been recorded in each subgroup increases by 5° C. from subgroup to subgroup (i.e. one respective group for the operating temperatures 15° C., 20° C., 25° C., 30° C., and 35° C.).

The method may further comprise determining an OCV voltage value of the traction battery after the predetermined time period has elapsed and finally determining the capacity of the battery based on the selected OCV characteristic curve.

In further embodiments, the threshold can correspond to zero. In this case, no current flows to or from the battery, and the predetermined time period can be considered a relaxation time of the battery. However, the actual physical relaxation time does not necessarily have to be waited for. It can suffice if a time period is waited after which the change in the OCV voltage value falls below a threshold value, i.e. only slowly changes so that further waiting does not yield a significant advantage in accuracy when determining the OCV voltage value. This time period can be considered a practical relaxation time.

In further embodiments, a direction of current flow, if different from zero, can remain the same during the predetermined time. Thus, during the predetermined time, either a charging operation or a discharging operation can occur with only a low current flow, and this can be interrupted by phases where no current is flowing at all. In normal driving of an electric vehicle, the traction battery arranged therein typically is discharged alternately to provide power to the powertrain and charged by recuperation brakes. These two operations alternate continuously at irregular intervals, so that the predetermined time during which battery current flow occurs only in one direction (if necessary, with interruptions to zero) is not given on its own. These alternating charging and discharging currents in normal driving of an electric vehicle cause gradients within the battery chemistry of the battery cells, and these gradients distort measurements of the neutral voltage. By minimizing the flow of power and restricting its flow in only one direction, the gradients can be minor or even negligible. For example, a pass descent in mountainous terrain can be set up to accommodate the predetermined time period therein. For this purpose, both the power input and the recuperation can be reduced to a minimum to determine a relatively precise OCV voltage value at the end of the pass descent. In an optimal case, no current flow to or from the battery occurs during the predetermined time period. Stated differently, the power output and power demand of the battery during the predetermined time period can be purposefully limited (or even forced to zero).

In further embodiments, a first parameter can equal or be correlated to a characteristic value indicative of the aging state of the traction battery. This can be the state of health (SoH) mentioned above.

In further embodiments, a second parameter can have a value that is correlated to or equals: i) an integral of the battery power flow, ii) the predetermined time period, or iii) a temperature value of the traction battery. Furthermore, the values of the maximum currents as well as their frequency and durations can be considered. In general, all values that significantly influence the electrochemical state of the battery come into consideration.

In further embodiments, a second parameter can equal or correlate to a charging power during a charging operation. For example, the charging operation can have taken place immediately before the start of the predetermined time period.

In further embodiments, the OCV characteristic curves in the group of OCV characteristic curves can correspond to experimentally determined or simulated OCV characteristic curves. In this determination, different operating parameters and cell chemistry characteristic curves can be adjusted on the battery and, by discharging or charging the battery in small increments, the respective OCV characteristic curves can be determined. A time is waited after each small discharging or charging step and corresponds to the predetermined time period and, in optimal cases, corresponds to the relaxation time. In particular, charging powers that correspond to typical charging powers at charging columns (e.g. 11 kW (AC), 22 kW (AC), 225 kW (DC)) can be set during charging to select a very well-matched OCV characteristic curve and thus be able to make the most accurate determination of the capacity after charging operations.

The invention also relates to a control device for a traction battery of a vehicle configured to determine the capacity of the traction battery according to the method described above. The control device can correspond to a battery control unit.

The aforementioned features and the features explained in the following text can be used in the respectively specified combination, and also in other combinations or on their own, without departing from the scope of the invention.

Additional advantages and configurations of the invention result from the description and the enclosed drawing.

BRIEF DESCRIPTION OF THE DRAWING

The one FIGURE of this disclosure shows a graph illustrating a group of different OCV characteristic curves.

DETAILED DESCRIPTION

The one FIGURE that forms part of this disclosure illustrates a group of OCV characteristic curves 31-33, 41-43 of an HV battery. The x-axis 1 shows the SOC degree and the y-axis 2 shows the OCV voltage (open clamping voltage applied). The OCV characteristic curves 31-33 correspond to those recorded during a charging operation. Analogously, the OCV characteristic curves 41-43 correspond to those recorded during a discharging operation. Generally, the number of discharging OCV characteristic curves 41-43 can equal or be different from the number of charging OCV characteristic curves 31-33.

Each OCV characteristic curve 31-33, 41-43 is associated with a parameter tuple (P1, P2, . . . Pn), which comprises, depending on the embodiment of the method, at least one cell chemistry parameter and one operating parameter. In the example shown, the OCV characteristic curves 31-33, 41-43 differ in pairs only in terms of the direction of the charging current, but otherwise have the same parameters.

Further, along the third charging OCV characteristic curve 33, the experimentally set charging points 5 are indicated. In the experimental determination of the OCV characteristic curve 33, the charging process is interrupted at each of the charging points to wait a predetermined time period and then carry out a measurement of the OCV voltage. In addition, it can be investigated how the OCV voltage changes during the course of the predetermined time period to investigate the relaxation behavior. As a result, a meaningful time scale for the predetermined time period can be found, which represents a practical compromise between accuracy of the final OCV voltage and the length of the time period. In particular, the predetermined time period can represent an operating parameter and can already be taken into account in the OCV characteristic curves 31-33, 41-43, to which the method described herein resorts. Thus, the OCV characteristic curves can be present in sub-groups, and each sub-group represents a different predetermined time period.

The invention claimed is:

1. A method for determining a capacity of a traction battery, comprising the following steps:
    initiating and/or waiting a predetermined time period during which a battery current is below a threshold amount;
    selecting an OCV characteristic curve from a group of OCV characteristic curves (31-33, 41-43) based on at least first and second parameters (P1, P2, . . . Pn), wherein at least the first parameter (P1) describes a cell characteristic of battery cells used in the traction battery, and at least the second parameter (P2) describes an operating parameter of the traction battery prior to the predetermined time period and/or during the predetermined time period and equals or is correlated to a charging power during a completed charging operation;
    determining an open circuit voltage of the traction battery after the predetermined time period has elapsed; and
    determining the capacity of the battery based on the selected OCV characteristic curve.

2. The method of claim 1,
    wherein the threshold equals zero.

3. The method of claim 1,
    wherein, during the time period, a direction of the current flow remains the same, provided it is different from zero.

4. The method of claim 1,
    wherein the first parameter (P1) equals or is correlated to a characteristic value indicative of an aging state of the traction battery.

5. The method of claim 1 wherein,
    the group of OCV characteristic curves (31-33, 41-43) comprises experimentally determined or simulated OCV characteristic curves.

6. A control device for a traction battery of a vehicle configured to determine the capacity of the traction battery according to the method of claim 1.

7. A method for determining a capacity of a traction battery, comprising the following steps:
    initiating and/or waiting a predetermined time period during which a battery current is below a threshold amount;
    selecting an OCV characteristic curve from a group of OCV characteristic curves (31-33, 41-43) based on at least first and second parameters (P1, P2 . . . Pn), wherein at least the first parameter (P1) describes a cell characteristic of battery cells used in the traction battery, and at least the second parameter (P2) describes an operating parameter of the traction battery prior to the predetermined time period and/or during the predetermined time period, wherein the second parameter (P2) has a value that is correlated to or equals an integral of the battery power flow;

determining an open circuit voltage of the traction battery after the predetermined time period has elapsed; and determining the capacity of the battery based on the selected OCV characteristic curve.

8. A method for determining a capacity of a traction battery, comprising the following steps:

initiating and/or waiting a predetermined time period during which a battery current is below a threshold amount;

selecting an OCV characteristic curve from a group of OCV characteristic curves (31-33, 41-43) based on at least first and second parameters (P1, P2, . . . Pn), wherein at least the first parameter (P1) describes a cell characteristic of battery cells used in the traction battery, and at least the second parameter (P2) describes an operating parameter of the traction battery prior to the predetermined time period and/or during the predetermined time period, wherein the second parameter (P2) has a value that is correlated to or equals the predetermined time period;

determining an open circuit voltage of the traction battery after the predetermined time period has elapsed; and determining the capacity of the battery based on the selected OCV characteristic curve.

* * * * *